United States Patent [19]

Garner

[11] 3,788,541

[45] Jan. 29, 1974

[54] COMPUTATION DEVICE AND METHOD
[76] Inventor: Norman Garner, 69-10 Yellowstone Blvd., Forest Hills, N.Y. 11375
[22] Filed: Sept. 15, 1972
[21] Appl. No.: 289,279

[52] U.S. Cl.......... 235/61 R, 235/61 DP, 235/71 A, 235/71 R, 235/76, 235/86, 235/88, 235/109
[51] Int. Cl. ... G06c 29/00, G06c 27/00, G06c 3/00
[58] Field of Search ... 235/71 R, 71 A, 76, 86, 125, 235/61 DP, 109

[56] References Cited
UNITED STATES PATENTS

| | | | |
|---|---|---|---|
| 3,685,727 | 8/1972 | Brookes | 235/88 |
| 3,536,897 | 10/1970 | Hubbard et al. | 235/86 |
| 3,276,684 | 10/1966 | Ritchie | 235/70 R |
| 2,826,361 | 3/1958 | Saliba | 235/71 R |
| 2,764,348 | 9/1956 | Johnson | 235/71 R |
| 2,578,705 | 12/1951 | Johnson | 235/71 A |
| 2,143,892 | 1/1939 | Ludecke et al. | 235/71 A |

FOREIGN PATENTS OR APPLICATIONS

| | | | |
|---|---|---|---|
| 471,113 | 1/1929 | Germany | 235/71.1 |
| 447,001 | 5/1936 | Great Britain | 235/71.1 |

Primary Examiner—Richard B. Wilkinson
Assistant Examiner—Vit W. Miska
Attorney, Agent, or Firm—Walter O. Ottesen

[57] ABSTRACT

A computation device for performing the mathematical operations of multiplication and division is disclosed. The device has a housing in which an indicator is fixedly located. There is a first logarithmic scale mounted in the housing so as to be movable with respect to the indicator. A second logarithmic scale is mounted so as to be movable adjacent the first scale and a gearing arrangement is provided which is engageable with the first and second scales for fixing the positions of the scales with respect to each other and for jointly moving the scale with respect to the indicator. The computation device can be used for converting a value in one set of units directly into a value in another set of units by providing a third logarithmic scale movable in fixed relation with the first scale. A method of converting from a value in one set of units to a value in another set of units using the computation device according to the invention is also disclosed.

17 Claims, 10 Drawing Figures

PATENTED JAN 29 1974

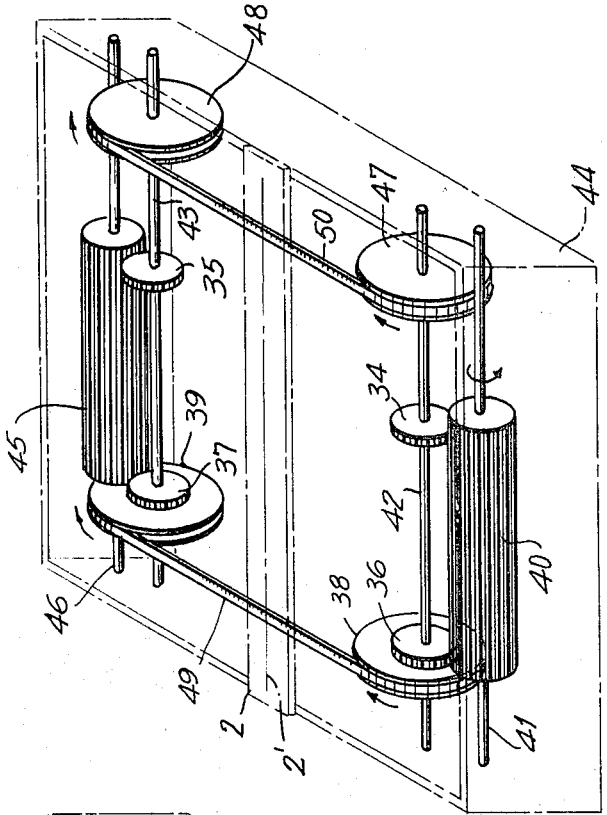
FIG. 5
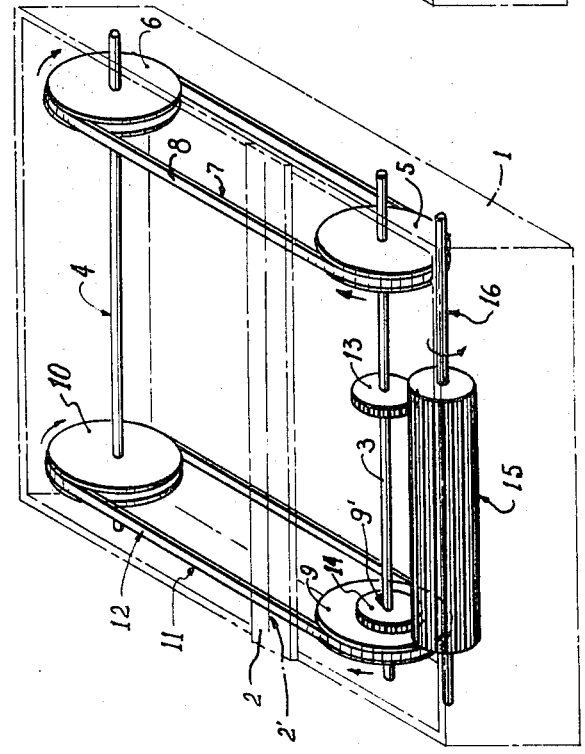
FIG. 6
FIG. 7
* INDICATES INDICES

COMPUTATION DEVICE AND METHOD

BACKGROUND AND SUMMARY OF THE INVENTION

My invention relates to computation devices for performing the mathematical operations of division and multiplication. More particularly, my invention relates to such a device that is easily adaptable for converting a value in one set of units directly into a value in another set of units. My invention also concerns a method of converting from a value in one set of units to a corresponding value in another set of units using the computation device of the invention for making such conversions.

It is desirable to have a computation device for performing the operation of division and multiplication which is both easy to use and to carry. Further, it is advantageous to have such a computation device that provides accuracy substantially greater than the accuracy afforded by the conventional slide rule.

In addition to being useable by persons not technically trained, the invention also can be used as a highly accurate calculating device. Unlike ordinary slide rules and circular slide rules whose accuracy is limited by their physical size, the accuracy of the device according to the invention is limited only by the length of tape used and, in as much as the tape is wound on a reel, the physical dimensions, other than the diameter of the reel accommodating the tape, do not change. Therefore a highly accurate, compact calculating device is provided by virtue of a long tape marked with a logarithmic scale for a length commensurate with the desired accuracy.

Accordingly, it is an object of my invention to provide a computing device which realizes the foregoing advantages.

It is a feature of the computation device of the invention to fixedly locate an indicator at the housing of the device. A first movable scale means is mounted in the housing for displaying a first logarithmic scale movable with respect to the indicator and a second movable scale means is also mounted in the housing for displaying a second logarithmic scale adjacent the first scale, the second scale being movable with respect to the indicator and the first scale. Gear means engageable with the first and second scale means for fixing the positions of the scales with respect to each other and for jointly moving the scales with respect to the indicator is also provided.

According to another feature of the invention, the scales of the first and second movable scale means both can be a complete logarithmic division corresponding to the C scales of a conventional slide rule.

The computation device of the invention includes two shafts in parallel spaced relation to each other rotatably mounted in the housing. The first movable scale means can include two first reels fixedly mounted on the shafts respectively so as to be rotatable therewith. A first tape having two end portions is would on the reels respectively so as to movably support the tape between the reels and beneath the indicator. A first logarithmic scale means is disposed on the first tape so as to be movable therewith and with respect to the indicator. The second movable scale means comprise two second reels slidably mounted on the shafts respectively. A second reel connecting means mutually connects the two second reels so as to cause a rotation of both of the second reels when one of the reels is driven. A second tape having two end potions is wound on the second reels respectively so as to movably support the second tape beneath the indicator and between the second reels adjacent the first tape. A second logarithmic scale means is disposed on the second tape so as to be movable therewith and with respect to the indicator. The gear means can include a first gear fixedly connected to one of the shafts, a second gear fixedly connected to one of the second reels, and a drive gear rotatably and slidably mounted in the housing so as to selectively engage one of: the first gear, the second gear, and the first and second gears simultaneously.

Often it is desirable to have a computation device that enables one to go from a value in one set of units to a value in another set of units without having to be concerned about the placement of the decimal point. Such an arrangement requires that the user be able to read the value sought directly from a scale showing the decimal point in its appropriate location.

Floating currencies with values changing relative to each other afford an excellent application for such a device. It is therefore another object of my invention to provide a computation device that enables one to convert a value in one set of units directly into a value in another set of units. Subsidiary to this object, it is an object of my invention to convert a value in one currency to the corresponding value in another currency.

The above referred to computation device for performing the operations of division and multiplication can be adapted to achieve the last mentioned objects. Thus, according to an alternate embodiment of the invention, I provide a device for converting a value in one set of units directly into a value in another set of units by supplementing the computation device discussed above with a third movable scale means mounted in the housing for displaying a third logarithmic scale adjacent at least one of the scales. The third scale means is fixedly connected with the first scale means for jointly moving the third and first scales with respect to the indicator. The scale of the first movable scale means has a plurality of groups of logarithmic divisions disposed linearly one next to the other representing one set of units; and the scale of the third movable scale means has a plurality of groups of logarithmic divisions disposed linearly one next to the other representing another set of units. The first mentioned plurality of groups of divisions are preset in fixed alignment with the last-mentioned plurality of groups of divisions. The scale of the second scale means has at least one set of logarithmic divisions representative of factors for converting a value from the one set of units to a value in the other set of units.

The computation device for unit conversion likewise is provided with two shafts in parallel spaced relation to each other rotatably mounted in the device housing.

According to a feature of the alternate embodiment the third movable scale means can comprise two third reels fixedly mounted on the shafts respectively so as to be rotatable therewith. A third tape having two end portions is wound on the third reels respectively so as to movably support the third tape beneath the indicator and between the third reels adjacent at least one of the first and second tapes. A third logarithmic scale means is disposed on the third tape so as to be movable therewith and with respect to the indicator. The scale of the first movable scale means has a plurality of groups of logarithmic divisions disposed linearly one next to the other representing one set of units. The scale of the third movable scale means has a plurality of groups of logarithmic divisions disposed linearly one next to the other representing another set of units. The first mentioned plurality of groups of divisions is preset in alignment with the last-mentioned plurality of groups of divisions. The scale of the second scale means has a group of logarithmic divisions representative of factors for converting a value from the one set of units to a value in the other set of units.

According to a further feature of the invention, the indicator can be a transparent window mounted in said housing and having a hairline extending thereacross perpendicularly to the first, second and third logarithmic scale means.

The computation device for unit conversion can be configured so as to enable one to convert one amount in one currency to an amount in another currency and, according to a feature of this embodiment, the one set of units referred to above can be the units of a first currency. The first group of the first scale extends from the lowest unit of the first currency to a multiple of ten thereof while the remaining groups of the first scale each successively extends from the highest value of the last preceding group to a multiple of ten thereof. The other set of units can be the units of a second currency. The first group of the third scale extends from the lowest unit of the second currency to a multiple of ten thereof, the remaining groups of the third scale each successively extending from the highest value of the last preceding group to a multiple of ten thereof. The factors of the second scale are factors fo converting a value of the first currency to a value in the second currency. The first scale is preset with respect to the third scale, so that when the index of the second scale is set with respect to a given value of the first currency on the first scale, and the first and second scales are moved together until the appropriate conversion factor appears under the indicator, the correct value of the second currency is readable from the third scale directly under the indicator.

A subsidiary feature of the currency conversion computation device includes as part of the scale of the second scale means an additional group of logarithmic divisions representative of factors for converting a value of the second currency to a value in the first currency.

The currency conversion device can be constructed for converting an amount in the first currency into an amount in at least one further currency, the third logarithmic scale means having a further plurality of groups of logarithmic divisions disposed linearly one next to the other representing units of the further currency, the first group of the further plurality of groups extending from the lowest unit of the further currency to a multiple of ten thereof, the remaining groups of the further plurality of groups each successively extending from the highest value of the last preceding group to a multiple of ten thereof, and the scale of the second scale means having an additional group of logarithmic divisions representative of factors for converting a value of the first currency to a value in the further currency, the further plurality of groups of logarithmic divisions being preset with respect to the first scale.

The simplicity of operation for the user is that with the first and third scale fixed relative to one another, and the second scale marked as to its starting point, the decimal points on all scales can be indicated so that it is unnecessary for the user to make a mental note of the various decimal points in the multiplicand, multiplier or result and, conversely, in the dividend, divisor, and quotient. This feature facilitates use of the device of the invention by the many people not skilled in the use of a calculating device.

With the scales approximately marked for conversion of one currency to another, any layman can easily convert currencies at whatever exchange rate is in effect at that time with the device showing: the currency to be converted with the decimal point clearly indicated, the exchange rate with the decimal point clearly indicated, and the second currency with the decimal point clearly indicated.

The alternate embodiment can easily be adapted for converting an amount in area to an amount in volume. The one set of units referred to above can be units of area. The first group of the first scale then extends from the lowest unit of area to a multiple of ten thereof. The remaining groups of the first scale each successively extends from the highest value of the last preceding group to a multiple of ten thereof. The other set of units are units of volume. The fitst group of the third scale extends from the lowest unit of the volume to a multiple of ten thereof. The remaining groups of the third scale successively extend from the highest value of the last preceding group to a multiple of ten thereof. The factors of the second scale are factors for converting a value of the area to a value of volume. The first scale is preset with respect to the third scale, so that when the index of the second scale is set with respect to a given value of the area of the first scale, and the first and second scales are moved together until the appropriate conversion factor appears under the indicator, the correct value of the volume is readable from the third scale directly under the indicator.

As a subsidiary feature of the area-volume conversion device, the scale of the second scale means can have an additional group of logarithmic divisions representative of factors for converting a value of the volume to a value in area.

Although the invention is illustrated and described herein as a computation device and method, it is nevertheless not intended to be limited to the details shown, since various modifications may be made therein within the scope and the range of the claims. The invention, however, together with additional objects and advantages will be best understood from the following description and in connection with the accompanying drawings.

BRIEF DESCRIPTION OF THE DRAWINGS

FIGS. 3A to 3D illustrate in plan view various positions of the scales of the device of FIG. 2 for performing a conversion of a value in French francs to a corresponding value of United States dollars.

FIG. 4 illustrates in plan view a scale of the device of FIG. 2 equipped with two sets of conversion factors.

FIG. 5 illustrates in plan view the scales of the device of FIG. 2 expanded to include sets of scale dimensions for converting values between various foreign currencies and the United States dollar.

FIG. 6 shows an embodiment of the computation device of the invention wherein the tapes of the respective scale assemblies themselves are looped taut about the tape reels.

FIG. 7 shows an embodiment of the computation device equipped with two drive gears for moving the tapes of the scale assemblies in different directions beneath the scale indicator.

DESCRIPTION OF THE PREFERRED EMBODIMENTS OF THE INVENTION

Figure 1:
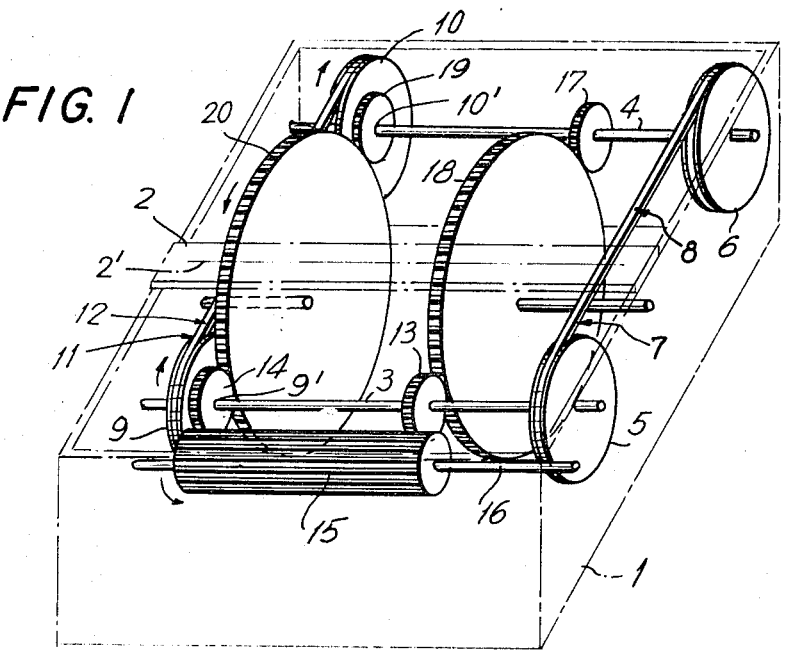
FIG.1 is a perspective view of the computation device according to the invention for performing the mathematical operations of multiplication and division.

Referring to FIG. 1, a computation device for performing the mathematical operations of multiplication and division has a housing 1 with a hairline indicator 2. Two shafts 3 and 4 are in parallel spaced relation to each other and are rotatably mounted in the housing. A first movable scale assembly includes two first reels 5 and 6 fixedly mounted on shafts 3 and 4 respectively so as to be rotatable therewith. A first reel connecting means mutually connects the first reels so as to cause a rotation of both of the first reels when one of the first reels is driven. A first tape 7 has two end portions wound on reels 5 and 6 respectively so as to movably support the tape between the reels 5, 6 and beneath the indicator 2. A first logarithmic scale 8 is provided on tape 7 so as to be movable therewith and with respect to the indicator.

A second movable scale assembly includes two second reels 9 and 10 slidably mounted on shafts 3 and 4 respectively by means of collars 9' and 10'. A second reel connecting means for mutually connecting the reels 9 and 10 so as to cause rotation of both of the second reels when one of the second reels is driven is also provided. A second tape 11 has two end portions wound on the second reels 9 and 10 respectively so as to movably support the second tape beneath the indicator and between the second reels adjacent the first tape 7. A second logarithmic scale 12 is located on the second tape so as to be movable therewith and with respect to the indicator 2. A gear arrangement includes a first gear 13 fixedly connected to shaft 3 and a second gear 14 fixedly connected to reel 9. A drive gear 15 is rotatably and slidably mounted on a shaft 16 in the housing 1 so as to selectively engage one of the following: gear 13, gear 14, and gears 13 and 14 simultaneously.

The first reel connecting means can comprise a first ancillary gear 17 fixedly connected to shaft 4, an idler gear 18 coupling the gear 17 to gear 13. The second reel connecting means can comprise a second ancillary gear 19 mounted on reel 10 and a second idler gear 20 coupling gear 19 to the second gear 14.

The computation device of FIG. 1 can be supplemented with a third movable scale assembly to form a computation device for converting a value in one set of units directly into a value in another set of units. The third movable scale assembly displays a third logarithmic scale adjacent one of the other two scales 8,12.

Figure 2:
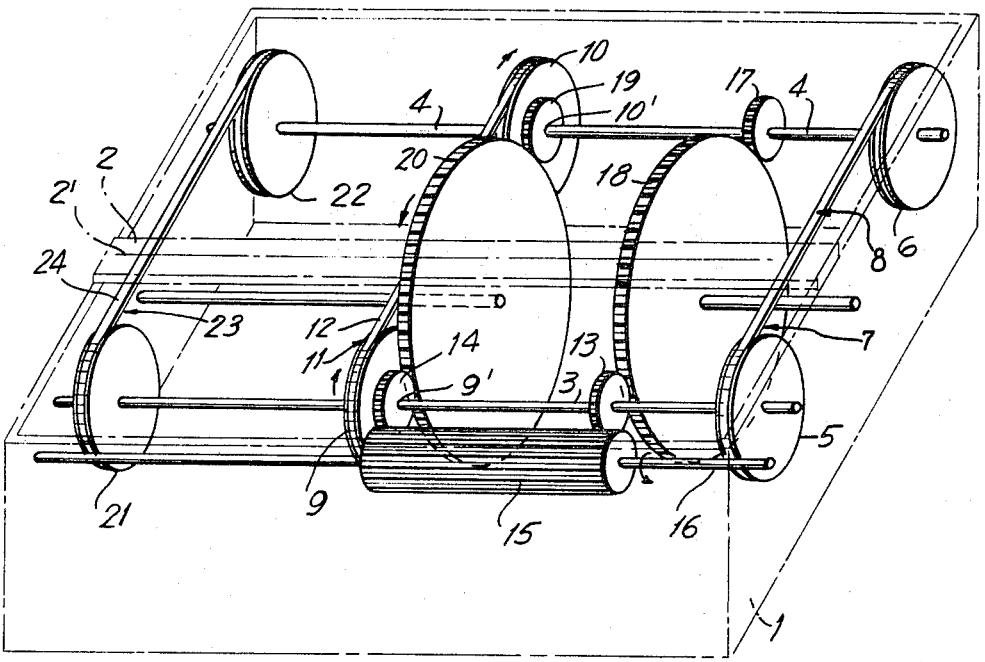
FIG. 2 is a perspective view of another embodiment of the invention wherein a computation device is supplemented to constitute a device for performing conversions from a value in one set of units to a value in another set of units.

FIG. 2 illustrates such a computation device for unit conversion. The third reel assembly includes two third reels 21 and 22 fixedly mounted on shafts 3 and 4 respectively. A third tape 23 has two end portions wound on reels 21 and 22 respectively so as to movably support the tape between the reels 21, 22 and beneath the indicator 2 adjacent the second tape 11. A third logarithmic scale 24 is on the third tape 23 so as to be movable therewith and with respect to the indicator. Since the reels 21, 22 are fixedly mounted on the respective shafts 3, 4, the third scale 24 moves together with and in fixed relation to the first scale 8.

In the embodiment according to FIG. 2, the first scale 8 is a plurality of groups of logarithmic divisions disposed linearly one next to the other representing one set of units and the third scale 24 can have a plurality of groups of logarithmic diversions disposed linearly one next to the other representing another set of units. The second scale 12 is a group of logarithmic divisions representative of factors for converting a value in the set of units of the first scale to a value in the set of units of the third scale.

The device of FIG. 2 is applicable for converting a value in one currency to a value in another currency. The units on the first scale 8 can be units of a first currency and the first group of divisions of this scale extends from the lowest unit of the first currency to a multiple of ten thereof. The remaining groups of the first scale each successively extends from the highest value of the last preceding group to a multiple of ten thereof.

The third scale 24 can be units of a second currency and the first group of divisions of this scale extends from the lowest unit of the second currency to a multiple of ten thereof. The remaining groups of divisions of scale 24 each extend successively from the highest value of the last preceding group to a multiple of ten thereof.

FIG. 3 shows the scales of the converting device of FIG. 2 wherein the device is configured for converting French francs to United States dollars. FIG. 3 shows the tapes unwound in plan view so that a substantial portion of the full scale can be illustrated. The first scale 8 and the third scale 24 are French francs and United States dollars respectively. The second scale 12 comprises the conversion factors for converting francs to dollars. The first scale 8 and the third scale 24 are preset with respect to each other and since the reels corresponding to these scales are fixedly mounted on the shafts 3 and 4, the scales 8 and 24 will pass together beneath the hairline of the indicator. FIG. 3A shows a scale 12 in any given position relative to scales 8 and 24.

The steps to be performed when converting from a value in French francs, for example 100 Ffr to a corresponding value in U.S. dollars, on a day that the conversion rate is 0.18 U.S. dollars/Ffr includes moving the drive gear 15 to engage the first gear 13, turning the drive gear 15 until the value of 100 Ffr appears under the hairline 2' (FIG. 3B). The drive gear 15 is then moved to disengage the first gear 13 and to engage the second gear 14. With gear 14 engaged, gear 15 is turned until the index 25 of scale 12 appears below the hairline 2'. The drive gear 15 is now moved to engage both gears 13 and 14. The drive gear is then turned until the desired conversion factor 0.18 U.S.$/Ffr. appears beneath the hairline 2' (FIG. 3C). The value in United States dollars is $18.00 and is read directly off the third scale at 26 below the hairline 2' (FIG. 3D).

The scales shown in FIG. 3 are easily adapted for converting a value in dollars to a value in francs merely by adding another set of conversion factors to scale 12 as shown in FIG. 4. Here the conversion factors 27 range from 1.0 to 10.0 and the conversion factor corresponding to 0.18 referred to above is 5.56. The procedure for determining a value in francs is the same as used previously for determining a value in dollars except that now, the index 28 is first set with respect to the hairline before all scales are moved until 5.56 appears under the hairline 2'.

The conversion factors and scales shown in FIG. 3 can be used to convert a value in any currency into United States dollars where the conversion factor lies in the range of 0.1 to 1.0 $/per unit of foreign currency. For example, for German marks, the conversion factor on a particular day could be 0.31. If it is desired to conspicuously label the scales for converting different pairs of currencies, they can be placed in sets along the tapes 7 and 23 as shown at reference numerals 29 to 33 in FIG. 5. The conversion factors 27, 28 are suitable for making conversions in any of the currencies depicted. At 32 in FIG. 5 is shown a suitable scale arrangement for British pounds. With this arrangement the scales 27 and 28 may be used as described above in connection with the French francs. At 33 in FIG. 5 is a pair of scales for converting with Japanese yen. The dollar scale divisions in each instance are set permanently with respect to the scale divisions of the foreign currency so that both move together when the drive gear 5 is turned while in engagement with first gear 13.

According to another embodiment the respective tapes 7 and 12 are continuous and looped taut about reels of their respective movable scale assemblies as shown in the computation device of FIG. 6. In such configuration, the idler gears 18 and 20 as well as first and second ancillary gears 17 and 19 shown in FIG. 1 are not necessary. The tapes are sufficiently taut so that when one reel is rotated, the other reel of the scale assembly is rotated in the manner of a belt drive.

For a conversion device based on the device of FIG. 6, thy tape of the third scale assembly can also be looped taut about the reels thereof.

FIG. 7 illustrates still another embodiment of the computation device of the invention wherein the tapes are supported in the manner illustrated in FIG. 1. Here however, no idler gears are provided. Instead, gear means is provided comprising two first gears 34 and 35 fixedly connected to the shafts 42 and 43 respectively, two second gears 36 and 37 connected to reels 38 and 39 respectively, and a first gear 40 rotatably and slidably mounted in the housing on a shaft 51 so as to selectively engage one of: (a) gear 34, (b) gear 36, (c) gears 34 and 36 simultaneously. The shafts 41, 42 and 43 are all mounted in a housing 44. Shafts 42 and 43 are rotatably mounted. The gear means further comprises a second drive gear 45 rotatably and slidably mounted in the housing 44 on a shaft 46. The second drive gear so mounted can selectively engage one of (a) gear 35, (b) gear 37 and (c) gears 35 and 37 simultaneously. Drive gear 40 can be rotated to turn the tapes 49, 50 individually or together so that they move beneath the indicator 2 and wind on the respective reels 38 and 47. The drive gear 45 moves the tapes individually or together so as to wind on the respective reels 39 and 48. If a conversion device is desired, an additional movable scale assembly can be mounted on the shafts 42 and 43.

I claim:

1. A device for multiplying and dividing comprising a housing, an indicator fixedly located at said housing, first movable scale means mounted in said housing for displaying a first logarithmic scale movable with respect to said indicator, second movable scale means mounted in said housing for displaying a second logarithmic scale adjacent said first scale, said second scale being movable with respect to said indicator and said first scale, gear means engageable with said first and second scale means for fixing the positions of said scales with respect to each other and for jointly moving said scales with respect to said indicator, and two shafts in parallel spaced relation to each other rotatably mounted in said housing; said first movable scale means comprising two first reels fixedly mounted on said shafts respectively so as to be rotatable therewith, first reel connecting means for mutually connecting said two first reels so as to cause a rotation of both of said first reels when one of said first reels is driven, a first tape having two end portions wound on said reels respectively so as to movably support said tape between said reels and beneath said indicator, and first logarithmic scale means disposed on said first tape so as to be movable therewith and with respect to said indicator; said second movable scale means comprising two second reels slidably mounted on said shafts respectively, second reel connecting means for mutually connecting said two second reels so as to cause a rotation of both of said second reels when one of said second reels is driven, a second tape having two end portions wound on said second reels respectively so as to movably support said second tape beneath said indicator and between said second reels adjacent said first tape, and second logarithmic scale means disposed on said second tape so as to be movable therewith and with respect to said indicator; said gear means comprising a first gear fixedly connected to one of said shafts, a second gear fixedly connected to one of said second reels, and a drive gear rotatably and slidably mounted in said housing so as to selectively engage one of: said first gear, said second gear, and said first and second gears simultaneously.

2. The device according to claim 1 for converting a value in one set of units directly into a value in another set of units comprising third movable scale means mounted in said housing for displaying a third logarithmic scale adjacent one of said scales, said third movable scale means comprising two third reels fixedly mounted on said shafts respectively so as to be rotatable therewith, a third tape having two end portions wound on said third reels respectively so as to movably support said third tape beneath said indicator and between said third reels adjacent at least one of said first and second tapes, and third logarithmic scale means disposed on said third tape so as to be movable therewith and with respect to said indicator, said scale of said first movable scale means having a plurality of groups of logarithmic divisions disposed linearly one next to the other representing one set of units, said scale of said third movable scale means having a plurality of groups of logarithmic divisions disposed linearly one next to the other representing another set of units, said first mentioned plurality of groups of divisions being preset in alignment with said last-mentioned plurality of groups of divisions, and said scale of said second scale means having a group of logarithmic divisions representative of factors for converting a value from said one set of units to a value in said other set of units.

3. The device according to claim 2, said indicator being a transparent window mounted in said housing and having a hairline extending thereacross perpendicular to said first, second, and third logarithmic scale means.

4. The device according to claim 3 for converting an amount in one currency to an amount in another currency, said one set of units being units of a first currency, the first group of said first scale extending from the lowest unit of said first currency to a multiple of ten thereof, the remaining groups of said first scale each successively extending from the highest value of the last preceding group to a multiple of ten thereof, said other set of units being units of a second currency, the first group of said third scale extending from the lowest unit of said second currency to a multiple of ten thereof, the remaining groups of said thrid scale each successively extending form the highest value of the last preceding group to a multiple of ten thereof, and said factors of said second scale being factors for converting a value of said first currency to a value in said second currency, said first scale being preset with respect to said third scale, so that when the index of the second scale is set with respect to a given value of the first currency on the first scale, and the first and second scales are moved together until the appropriate conversion factor appears under said indicator, the correct value of the second currency is readable from the third scale directly under the indicator.

5. The device according to claim 4, said scale of said second scale means having an additional group of logarithmic divisions representative of factors for converting a value of said second currency to a value in said first currency.

6. The device according to claim 4 for converting an amount in said first currency into an amount in at least one further currency, said third logarithmic scale means having a further plurality of groups of logarithmic divisions disposed linearly one next to the other representing units of the further currency, the first group of said further plurality of groups extending from the lowest unit of said further currency to a multiple of ten thereof, the remaining groups of said further plurality of groups each successively extending from the highest value of the last preceding group to a multiple of ten thereof, and said scale of said second scale means having an additional group of logarithmic divisions representative of factors for converting a value of said first currency to a value in said further currency, said further plurality of groups of logarithmic divisions being preset with respect to said first scale.

7. The device according to claim 4, each of said groups of logarithmic divisions of said scales being provided with decimal points for indicating appropriate numerical values, and said second scale being marked so as to indicate the starting index thereof.

8. The device according to claim 3 for converting an amount in area to an amount in volume, said one set of units being units of area, the first group of said first scale extending from the lowest unit of said area to a multiple of ten thereof, the remaining groups of said first scale each successively extending from the highest value of the last preceding group to a multiple of ten thereof, said other set of units being units of volume, the first group of said third scale extending from the lowest unit of said volume to a multiple of ten thereof, the remaining groups of said third scale each successively extending from the highest value of the last preceding group to a multiple of ten thereof, and said factors of said second scale being factors for converting a value of said area to a value in said volume, said first scale being preset with respect to said third scale, so that when the index of the second scale is set with respect to a given value of the area on the first scale, and the first and second scales are moved together until the appropriate conversion factor appears under said indicator, the correct value of the volume is readable from the third scale directly under the indicator.

9. The device according to claim 8, said scale of said second scale means having an additional group of logarithmic diversions representative of factors for converting a value of said volume to a value in said area.

10. The device of claim 1, said first reel connecting means comprising a first ancillary gear fixedly connected to the other of said shafts, and an idler gear coupling said ancillary gear to said first gear, and said second reel connecting means comprising a second ancillary gear mounted on the other one of said second reels, and a second idler gear coupling said second ancillary gear to said second gear.

11. A device for multiplying and dividing comprising a housing, an indicator fixedly located at said housing, first movable scale means mounted in said housing for displaying a first logarithmic scale movable with respect to said indicator, second movable scale means mounted in said housing for displaying a second logarithmic scale adjacent said first scale, said second scale being movable with respect to said indicator and said first scale, gear means engageable with said first and second scale means for fixing the positions of said scales with respect to each other and for jointly moving said scales with respect to said indicator, and two shafts in parallel spaced relation to each other rotatably mounted in said housing; said first movable scale means comprising two first reels fixedly mounted on said shafts respectively so as to be rotatable therewith, a first tape having two end portions wound on said reels respectively so as to movably support said tape between said reels and beneath said indicator, and first logarithmic scale means disposed on said first tape so as to be movable therewith and with respect to said indicator; said second movable scale means comprising two second reels slidably mounted on said shafts respectively, a second tape having two end portions wound on said second reels respectively so as to movably support said second tape beneath said indicator and between said second reels adjacent said first tape, and second logarithmic scale means disposed on said second tape so as to be movable therewith and with respect to said indicator; said gear means comprising two first gears fixedly connected to said shafts respectively, two second gears fixedly connected to said second reels respectively, a first gear rotatably and slidably mounted in said housing so as to selectively engage one of: one of said first gears, one of said second gears, and said one of said first gears and said one of said second gears simultaneously; and a second drive gear rotatably and slidably mounted in said housing so as to selectively engage one of: the other one of said first gears, the other one of said second gears, and said other one of said first gears and said other one of said second gears simultaneously.

12. The device according to claim 11 for converting a value in one set of units directly into a value in another set of units comprising third movable scale means mounted in said housing for displaying a third logarithmic scale adjacent one of said scales, said third movable scale means comprising two third reels fixedly mounted on said shafts respectively so as to be rotatable therewith, a third tape having two end portions wound on said third reels respectively so as to movably support said third tape beneath said indicator and between said third reels adjacent at least one of said first and second tapes, and third logarithmic scale means disposed on said third tape so as to be movable therewith and with respect to said indicator, said scale of said first movable scale means having a plurality of groups of logarithmic divisions disposed linearly one next to the other representing one set of units, said scale of said third movable scale means having a plurality of groups of logarithmic divisions disposed linearly one next to the other representing another set of units, said first mentioned plurality of groups of divisions being preset in alignment with said last-mentioned plurality of groups of divisions, and said scale of said second scale means having a group of logarithmic divisions representative of factors for converting a value from said one set of units to a value in said other set of units.

13. The device according to claim 12, each of said groups of logarithmic divisions of said scales being provided with decimal points for indicating appropriate numerical values, and said second scale being marked so as to indicate the starting index thereof.

14. A device for multiplying and dividing comprising a housing, an indicator fixedly located at said housing, first movable scale means mounted in said housing for displaying a first logarithmic scale movable with respect to said indicator, second movable scale means mounted in said housing for displaying a second logarithmic scale adjacent said first scale, said second scale being movable with respect to said indicator and said first scale, gear means engageable with said first and second scale means for fixing the positions of said scales with respect to each other and for jointly moving said scales with respect to said indicator, and two shafts in parallel spaced relation to each other rotatably mounted in said housing; said first movable scale means comprising two first reels fixedly mounted on said shafts respectively so as to be rotatable therewith, a first continuous tape looped taut on said reels respectively so as to movably support said tape between said reels and beneath said indicator as well as to mutually connect said two first reels so as to cause a rotation of both of said first reels when one of said first reels is driven; and first logarithmic scale means disposed on said first tape so as to be movable therewith and with respect to said indicator; said second movable scale means comprising two second reels slidably mounted on said shafts respectively, a second continuous tape looped taut on said second reels respectively so as to movably support said second tape beneath said indicator and between said second reels adjacent said first tape as well as to mutually connect said two first reels so as to cause a rotation of both of said second reels when one of said second reels is driven; and second logarithmic scale means disposed on said second tape so as to be movable therewith and with respect to said indicator; said gear means comprising a first gear fixedly connected to one of said shafts, a second gear fixedly connected to one of said second reels, and a drive gear rotatably and slidably mounted in said housing so as to selectively engage one of: said first gear, said second gear, and said first and second gears simultaneously.

15. The device according to claim 14 for converting a value in one set of units directly into a value in another set of units comprising third movable scale means mounted in said housing for displaying a third logarithmic scale adjacent to of said scales, said third movable scale means comprising two third reels fixedly mounted on said shafts respectively so as to be rotatable therewith, a third continuous tape looped taut on said third reels respectively so as to movably support said third tape beneath said indicator and between said third reels adjacent at least one of said first and second tapes, and third logarithmic scale means disposed on said third tape so as to be movable therewith and with respect to said indicator, said scale of said first movable scale means having a plurality of groups of logarithmic divisions disposed linearly one next to the other representing one set of units, said scale of said third movable scale means having a plurality of groups of logarithmic divisions disposed linearly one next to the other representing another set of units, said first mentioned plurality of groups of divisions being preset in alignment with said last-mentioned plurality of groups of divisions, and said scale of said second scale means having a group of logarithmic divisions representative of factors for converting a value from said one set of units to a value in said other set of units.

16. The device according to claim 15, each of said groups of logarithmic divisions of said scales being provided with decimal points for indicating appropriate numerical values, and said second scale being marked so as to indicate the starting index thereof.

17. The method of converting from a value in one set of units to a value in another set of units with the device of claim 2 including the steps of said drive gear to engage said first gear, turning said drive gear until a given value of the one set of units appears on said first scale under said indicator, moving said drive gear to disengage said first gear and to engage said second gear, turning said drive gear until the index of said second scale appears below said indicator, moving said drive gear to engage both said first and second gears, and turning said drive gear until the desired conversion factor appears beneath said indicator, whereby the value in said other set of units appears on said third scale directly below said indicator.

* * * * *